May 12, 1959 C. PAGE ET AL 2,886,168
MECHANISM FOR HANDLING EGGS
Filed Oct. 4, 1954 3 Sheets-Sheet 1
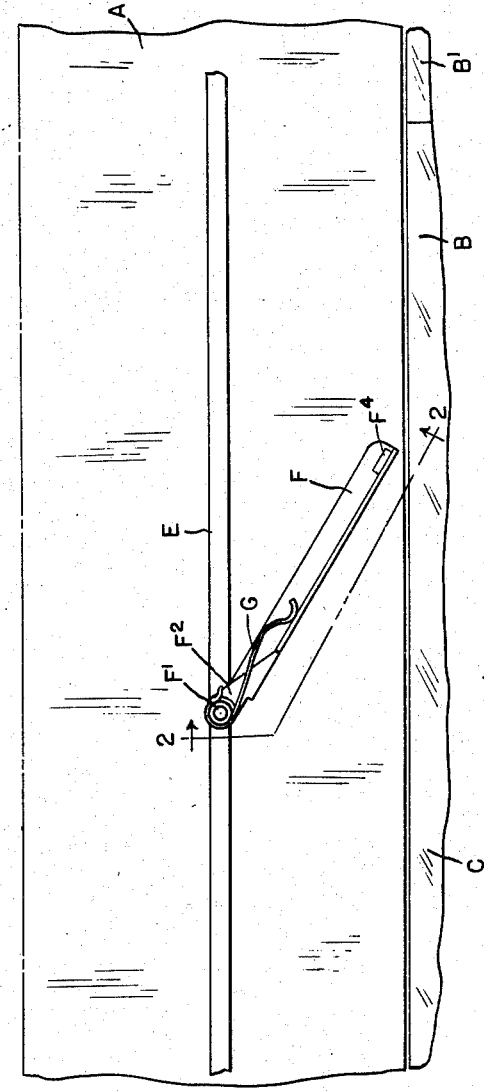
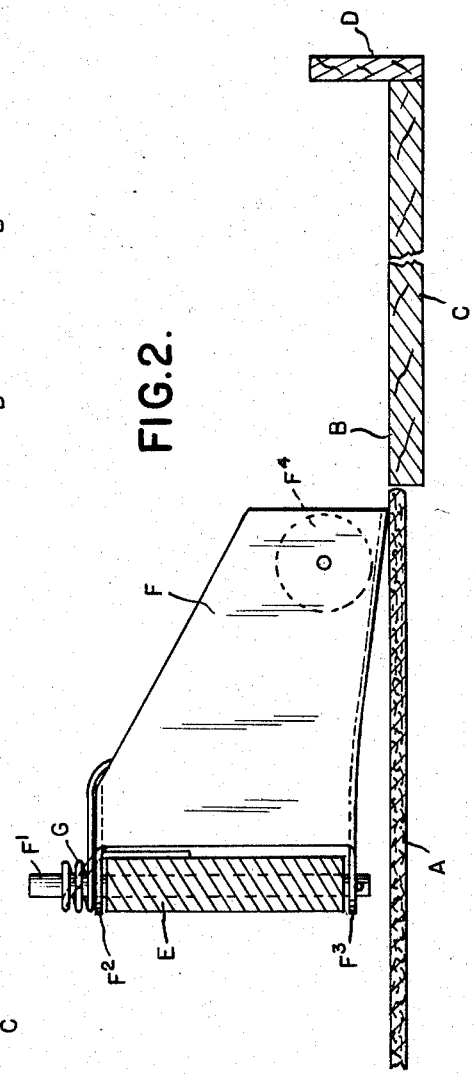
INVENTORS
CLARENCE PAGE
BY GEORGE A. PAGE
ATTORNEYS May 12, 1959  C. PAGE ET AL  2,886,168
MECHANISM FOR HANDLING EGGS
Filed Oct. 4, 1954  3 Sheets-Sheet 2
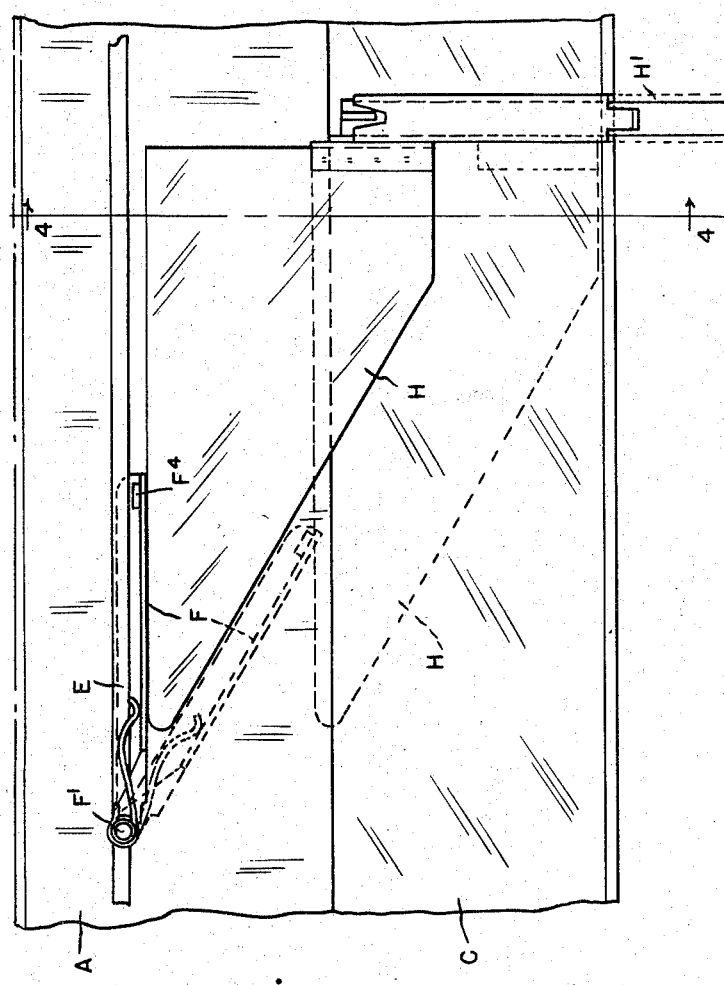
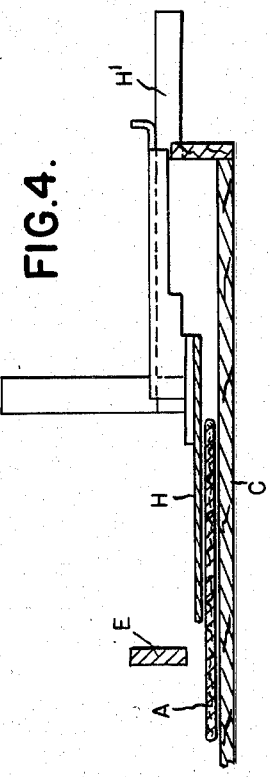
INVENTORS
CLARENCE PAGE
BY GEORGE A. PAGE
ATTORNEYS May 12, 1959 C. PAGE ET AL 2,886,168
MECHANISM FOR HANDLING EGGS
Filed Oct. 4, 1954 3 Sheets-Sheet 3

INVENTORS
CLARENCE PAGE
GEORGE A. PAGE
BY
ATTORNEYS

United States Patent Office 2,886,168
Patented May 12, 1959

2,886,168

MECHANISM FOR HANDLING EGGS

Clarence Page and George A. Page, Detroit, Mich., assignors to Page-Detroit, Inc., Southfield Township, Oakland County, Mich., a corporation of Michigan Application October 4, 1954, Serial No. 459,928

12 Claims. (Cl. 198—188)

The invention relates to a mechanism for handling eggs and more particularly for conveying and distributing eggs to a plurality of stations, at each of which operations such as candling, grading, et cetera, are manually performed.

It is one of the objects of the invention to obtain a construction by which distribution is automatically varied corresponding to conditions at the several stations.

It is a further object to accomplish this result without subjecting the eggs to impacts or other forces which might result in breakage.

It is a further object to provide a construction including a conveyor extending adjacent to a series of successive stations, each of which has a predetermined egg storage capacity and also including means for deflecting eggs from the conveyor at each station until filled to capacity and then automatically continuing advancement of the remaining eggs on the conveyor to another station.

It is a further object to provide under control of the operator additional storage capacity at a station and to check advancement of eggs on the conveyor when exceeding the capacity of the operator to take care of the same.

Still further it is an object to provide manually controlled means for stopping further deposit of eggs at a station where the latter is not filled to capacity.

With these and other objects in view the invention consists of the construction as hereinafter set forth.

In the accompanying drawings:

Fig. 1 is a plan view of a portion of the egg handling mechanism illustrating the automatic means controlling distribution of eggs between stations;

Fig. 2 is a cross-section on line 2—2 of Fig. 1;

Fig. 3 is a view similar to Fig. 1 showing the auxiliary storage means at a station;

Fig. 4 is a cross-section on line 4—4 of Fig. 3;

Figure 5:
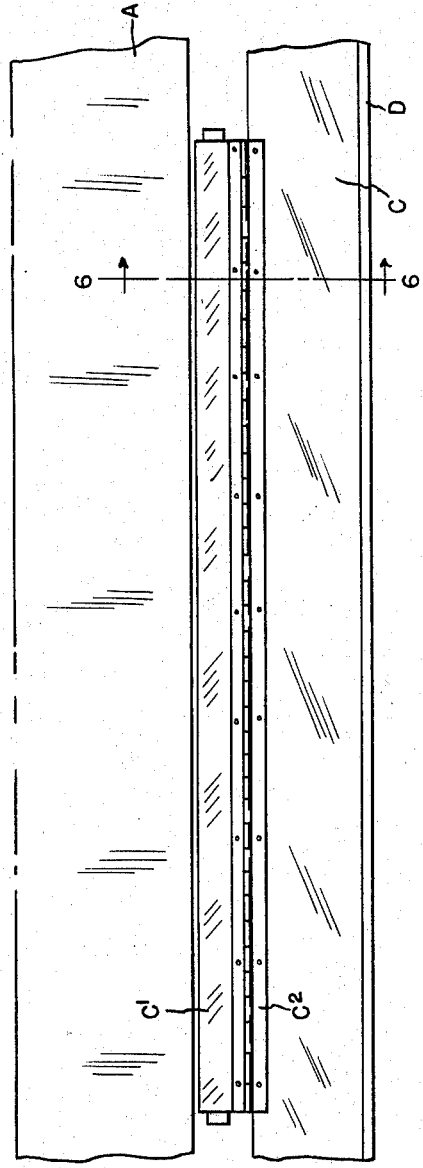
Fig. 5 is a plan view showing means for stopping deposit of eggs at a station when the latter is not filled to capacity.

As illustrated, A is a conveyor preferably a belt on which eggs from a source are deposited and which travels adjacent to a series of stations B, B'. Each of these stations has a platform C extending from beneath the belt laterally at one side thereof and having a rail D along its outer edge. E is a guide rail above and extending longitudinally of the belt A. This rail may be located in any desired position over the belt spaced a predetermined distance from the edge adjacent to the station. F is a gate pivotally attached at one end to the rail E by a pin F' and normally extending obliquely therefrom forward of the belt to the station edge thereof. The gate is preferably made of sheet material to be relatively low in weight and is provided with flanges $F^2$ and $F^3$ embracing the rail E above and below the same and engaging the pin F'. A light coil spring G is placed on the pin F' above the flange $F^2$ having its ends connected to the rail and to the gate to resiliently bias the latter towards its oblique position while permitting outward swinging to a position parallel to the rail. The free end of the gate rests upon the belt for a purpose that will be later described.

With the construction as thus far described if eggs are advanced on the belt A into contact with the gate F, they will be normally deflected thereby on to the platform C of a station. This will continue until the eggs thus deflected fill the platform from the rail D at the outer edge thereof to the edge of the belt A. Further lateral deflection of the eggs will be prevented by obstruction of those stored. The tension of the spring G is limited so as to permit swinging open of the gate by the pressure of eggs behind the same and this will permit them to continue advancement to another station, which is similarly provided with a gate F. To avoid danger of breakage of the eggs, the mass of the gate is relatively low to limit inertia thereof and the velocity of its return movement is also limited by the friction of the outer edge portion of the gate on the surface of the belt A. A weight $F^4$ attached to the outer end portion of the gate will provide a downward pressure required to produce the desired friction.

The quantity of eggs handled in a given time depends on the amount deposited on the belt from the source, and the operators at the several stations can usually take care of all deposited eggs. If, however, the quantity advanced is greater than the capacity of the operators, some provision is required for taking care of the surplus. One means for such purpose is shown in Figs. 3 and 4 and consists of an auxiliary storage for eggs at each station. This comprises a platform H beyond each gate F in the direction of advancement over the belt. The rear edge of this platform is obliquely inclined to correspond to the inclination of the gate in its normal position. Normally, the platform H is laterally withdrawn to be over the platform C and with only its edge portion overlapping the belt. When, however, additional storage space is required the platform H is moved outward, being guided by sliding engagement with a transverse rail H'. In this outer position, when the platform C at the station is filled with eggs and the gate F is swung open, the eggs continuing to advanve with the belt are forced upon the platform and accumulation thereon until the mass is sufficient to check further advancement. In other words, when the friction of the eggs deposited on the platform H is greater than the advancing force by friction of the belt, the whole mass will be held from further advancement and those eggs resting on the belt will be merely revolved. As soon as the operator is able to take care of the eggs at the station including the auxiliary storage, the platform H can be withdrawn.

Figure 6:
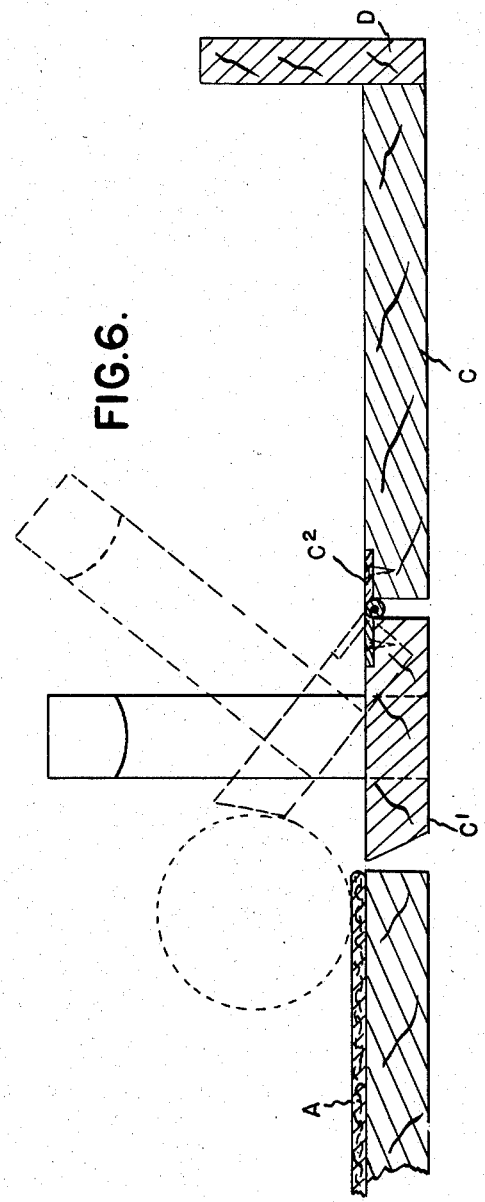
Fig. 6 is a section on line 6—6 of Fig. 5.

For some uses and particularly in connection with hatcheries, it is desirable to separate eggs with respect to origin. Thus, if the eggs of one class advanced by the belt are less in quantity than the storage capacity of a station, it is desirable to prevent other eggs from being deposited at the same station. This is accomplished by an additional gate which may at any time be manually placed between the belt and the station. A simple construction is shown in Figs. 5 and 6 where the station platform C has a separate portion C' thereof adjacent to but not underlapping the belt. This portion C' is connected to the portion C by a hinge $C^2$ which permits of swinging it upward. This will oppose any further deflection of eggs off the belt onto the platform C.

With the apparatus as above described the advancement and distribution of the eggs to the several stations may be regulated to suit conditions and with a minimum danger of breakage.

What we claim as our invention is:

1. In mechanism for handling eggs, a conveyor traveling in a horizontal plane for advancing eggs thereon, a station platform adjacent one side of said conveyor in substantially the same plane, a gate above said conveyor pivotally mounted to be movable from a position extending obliquely across the same for deflecting the eggs onto said platform to a non-deflecting position parallel to the direction of conveyor movement, and resilient pressure means for normally holding the gate in the former position limited to yield to cumulative pressure of eggs against said gate occasioned by resistance to deflection of eggs onto the platform by those previously deposited thereon, said yielding pressure being less than one endangering breakage of eggs and permitting continued advancement thereof with the conveyor.

2. The construction as in claim 1 in which said station has limiting means for the area on which eggs may be deposited whereby eggs filling said area will block further deflection of eggs from said conveyor.

3. The construction as in claim 2 having a series of successive stations adjacent to said conveyor, each provided with a gate of the character described.

4. The construction as in claim 1 in which the resilient pressure is sufficient to return said gate against egg pressure when deflection is unopposed.

5. The construction as in claim 4 having means for retarding the velocity of return movement of said gate to limit its impact pressure against the eggs and thereby avoid breakage.

6. The construction as in claim 5 in which said retarding means is formed by friction of the gate having its free end resting upon said conveyor.

7. The construction as in claim 2 having additional storage means for eggs at said station when said gate is displaced.

8. The construction as in claim 7 in which said additional storage means comprises a plate movable over said conveyor beyond said gate on which the eggs advancing with said conveyor are deposited when said gate is displaced.

9. The construction as in claim 8 in which said plate is sufficient in area to eventually prevent further advancement of eggs on the conveyor by the frictional resistance of deposited eggs on the plate.

10. The construction as in claim 9 in which said gate extends obliquely over said conveyor and said plate has a corresponding oblique rear edge adjacent to said gate in its normal position.

11. The construction as in claim 2 provided with additional manually controlled means for blocking displacement of eggs from said conveyor when said station is not filled with eggs to its capacity but after a predetermined number have been received.

12. The construction as in claim 11 in which said additional means is a second gate adjacent to said conveyor normally out of path of eggs displaced therefrom but movable into said path.

References Cited in the file of this patent
UNITED STATES PATENTS

| | | |
|---|---|---|
| 856,993 | Teague | June 11, 1907 |
| 1,558,014 | Jaenicke | Oct. 20, 1925 |
| 1,929,913 | Clemon et al. | Oct. 10, 1933 |
| 2,804,961 | Carter | Sept. 3, 1957 |